United States Patent
Ding et al.

(10) Patent No.: US 7,891,228 B2
(45) Date of Patent: Feb. 22, 2011

(54) DUAL-MODE MASS FLOW VERIFICATION AND MASS FLOW DELIVERY SYSTEM AND METHOD

(75) Inventors: Junhua Ding, Tewksbury, MA (US); Kaveh Zarkar, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 12/273,234

(22) Filed: Nov. 18, 2008

(65) Prior Publication Data

US 2010/0125424 A1 May 20, 2010

(51) Int. Cl.
*G01F 25/00* (2006.01)
(52) U.S. Cl. ........................................................ 73/1.35
(58) Field of Classification Search ........................ None
See application file for complete search history.

(56) References Cited

U.S. PATENT DOCUMENTS

| | | | | |
|---|---|---|---|---|
| 3,475,949 | A * | 11/1969 | Truhan | ........................ 73/1.32 |
| 5,684,245 | A | 11/1997 | Hinkle | |
| 7,343,775 | B2 * | 3/2008 | Cunningham et al. | ........ 73/1.06 |
| 7,474,968 | B2 * | 1/2009 | Ding et al. | ..................... 702/45 |
| 2004/0261492 | A1 | 12/2004 | Zarkar et al. | |
| 2006/0005882 | A1 | 1/2006 | Tison et al. | |
| 2006/0130744 | A1 | 6/2006 | Clark | |
| 2006/0283254 | A1 | 12/2006 | Ding et al. | |
| 2007/0042508 | A1 * | 2/2007 | Shajii et al. | ..................... 438/5 |
| 2009/0183549 | A1 * | 7/2009 | Monkowski et al. | ......... 73/1.35 |

FOREIGN PATENT DOCUMENTS

WO     WO2006/017116     2/2006

OTHER PUBLICATIONS

International Search Report dated Feb. 11, 2010 from corresponding PCT Application No. PCT/US2009/064948.

* cited by examiner

*Primary Examiner*—Robert R Raevis
(74) *Attorney, Agent, or Firm*—McDermott Will & Emery LLP (57) ABSTRACT

A system performs mass flow delivery of a fluid, and also performs mass flow verification of the fluid. The system includes an inlet valve that controls flow of the fluid into a chamber, an outlet valve that controls flow of the fluid out of the chamber, a pressure transducer that measures the pressure of the fluid within the chamber, a temperature sensor that measures the temperature of the fluid within the chamber, and a controller. The controller is configured to control opening and closing of the inlet and outlet valves, using the measurements of the pressure and the temperature change within the chamber, so as to verify, when in a first mode, a measurement of the flow rate of the fluid by a device, and so as to deliver, when in a second mode, a desired amount of the fluid from the chamber into a processing facility.

14 Claims, 5 Drawing Sheets

DUAL-MODE MASS FLOW VERIFICATION AND MASS FLOW DELIVERY SYSTEM AND METHOD

BACKGROUND

A mass flow verifier (MFV) may be used to verify the accuracy of high-precision fluid delivery systems such as mass flow controllers (MFCs) and mass flow ratio controllers (FRCs). Typically, a mass flow verifier may include a chamber, a pressure transducer, a temperature sensor and two isolation valves, one upstream and one downstream. The valves may be closed during idle, and may open when a run is initiated, allowing flow of fluid from the device under test (DUT) such as a MFC or a FRC through the flow verifier. Once fluid flow has stabilized, the downstream valve may be closed, and as a result the pressure may rise in the chamber, and the raise in pressure may be measured as well the gas temperature. These measurements may be used to calculate the flow rate and thereby verify the performance of the DUT.

A mass flow delivery device, such as a Mole Delivery Device (MDD), may be used to accurately deliver desired amounts of gases into semiconductor processing chambers. Such mass flow delivery devices may provide highly repeatable and precise quantities of gaseous mass for use in semiconductor manufacturing processes, for example atomic layer deposition (ALD) processes.

In the last few years cost reduction initiatives for semiconductor processing tools have had a significant impact on the design of the fluid delivery systems, by streamlining the design and reducing foot print. While the size and complexity of the fluid delivery systems have been reduced, the need for verification and precision of the delivery has increased.

Both features, i.e. mass flow delivery and mass flow verification, are necessary due to the increased requirement for flow accuracy as well as the delivery of critical fluid(s) into the process chambers. The cost to customers for owning both a MFV and a MDD, however, is expensive and onerous. Also, MDDs tend to have a large footprint.

Accordingly, there is a need for systems and methods that would provide customers a cost effective solution to the requirements of both mass flow verification and mass flow delivery.

SUMMARY

A system performs mass flow delivery of a fluid, as well as mass flow verification of the fluid. The system includes an inlet valve configured to control flow of the fluid into a chamber, an outlet valve configured to control flow of the fluid out of the chamber, a pressure sensor configured to measure pressure within the chamber, and a controller. In some embodiments, the system may also include a temperature sensor configured to measure temperature within the chamber.

The controller is configured, when in a first mode, to control opening and closing of the inlet and outlet valves so as to verify a measurement of the flow rate of the fluid by a device under test, using the measurements of the pressure and the temperature change within the chamber. The controller is further configured, when in a second mode, to control opening and closing of the inlet and outlet valves so as to deliver a desired amount of the fluid from the chamber into a processing facility, using the measurements of the pressure and the temperature change within the chamber.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings disclose illustrative embodiments. They do not set forth all embodiments. Other embodiments may be used in addition or instead. When the same numeral appears in different drawings, it is intended to refer to the same or like components or steps.

DETAILED DESCRIPTION

In the present disclosure, systems and methods are disclosed that allow a single system to perform both mass flow verification and mass flow delivery, resulting in cost saving for customers and space saving for manufacturers.

Illustrative embodiments are now discussed. Other embodiments may be used in addition or instead.

Figure 1:
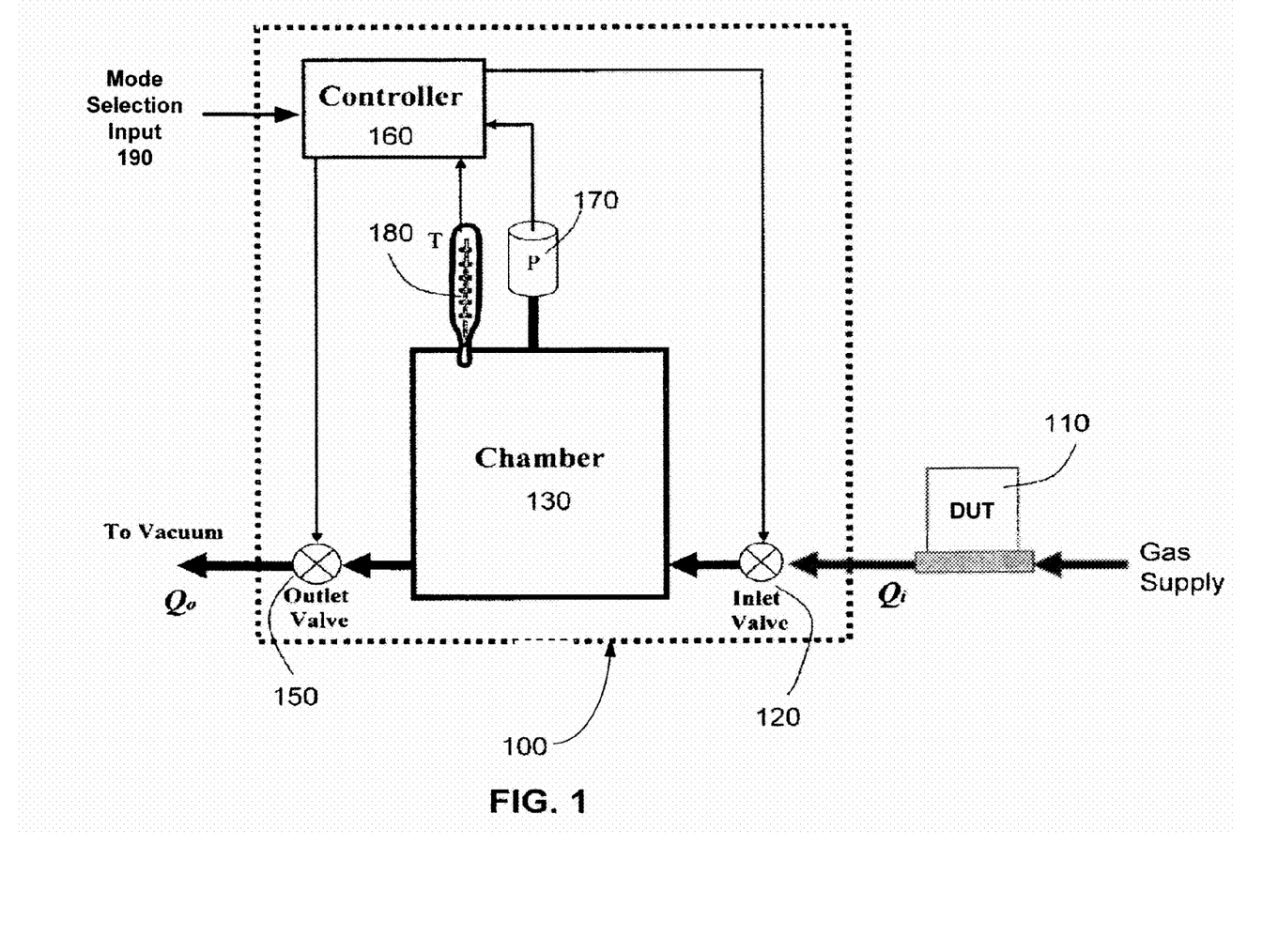
FIG. 1 illustrates a block diagram of a mass flow verifier.

FIG. 1 is a block diagram of a mass flow verifier 100. The MFV 100 includes an enclosed volume or chamber 130 (having a known volume $V_c$) that is configured to receive a flow of a fluid from a device under test (DUT) 110. The DUT 110 shown in the illustrated embodiment is an MFC that delivers a desired flow rate of the fluid. An MFC is typically a self-contained device that includes a mass flow sensor, control valves, and control and signal-processing electronics, and can be used to repeatedly deliver desired fluid flow rates. Examples of the DUT 110 may include, but are not limited to, a mass flow controller (MFC) and a mass flow ratio controller (FRC).

An inlet valve 120 shuts on and off the flow of fluid from the DUT 110 into the chamber 130. An outlet valve 150 shuts on and off the flow of the fluid from the chamber 130. The MFV 100 further includes a pressure sensor 170 configured to measure pressure of the fluid within the chamber 130, and a temperature sensor 180 configured to measure temperature of the fluid within the chamber 130. Typically, the fluid whose mass flow rate is being verified is a gas, although flow rates of other types of fluids may also be verified by the MFV 100.

While in the embodiment illustrated in FIG. 1, the device being tested by the MFV 100 is illustrated as being a single DUT (MFC) 110, it should be noted that in other embodiments, a plurality of DUTs may be connected to and tested by the MFV 100. The plurality of DUTs may be connected to the MFV 100 via a gas manifold, for example.

A controller 160 is connected to the MFV 100, and is responsive to the user defined input 190 so as to operate in one of two user selected modes. In one mode the controller 160 controls the in-situ verification of the performance of the DUT 110, and in the second mode the controller 160 controls the operation of the inlet valve 120 and the outlet valve 150. In one embodiment of the MFV 100, the controller 160 may implement a "rate-of-rise" (ROR) technique flow verification technique to perform mass flow verification. When the ROR technique is implemented, the flow rate of the fluid is determined by causing the fluid to flow into a known volume, and measuring the pressure rise that occurs during a given interval of time.

The basic principle of a ROR MFV is a mass balance over the chamber 130. Using the mass balance equations, and applying the ideal gas law to the gas in the chamber, the inlet fluid flow rate can be obtained by measuring the pressure and the temperature of the gas (or other fluid) in the chamber 130 of MFV 100 according to the following equation:

$$Q_{in} = \frac{k_0 \cdot T_{stp} \cdot V_c}{P_{stp}} \frac{d}{dt}\left(\frac{P}{T}\right) \quad (1)$$

where P is the gas pressure within the chamber;
T is the gas temperature;
$V_c$ is the volume of the chamber vessel;
$k_0$ is a conversion constant, $6 \times 10^7$ in sccm (standard cubic centimeters per minute) units and $6 \times 10^4$ in slm (standard liters per minute) units;
$P_{stp}$ is the standard pressure (=1.01325e5 Pa); and
Tstp is the standard temperature (=273.15 K).

The controller 160 receives the output signals from the pressure sensor 170 and temperature sensor 180, and controls the operation of the inlet valve 120 and the outlet valve 150, based on the received output signals. The controller 160 measures a rate of rise in pressure of the fluid within the chamber 130 after the outlet valve 150 is closed, and using the measured rate of rise of pressure over time and temperature to calculate the flow rate $Q_{in}$ of the fluid from the DUT 110 into the chamber 130 according to Eq. (1).

In an exemplary embodiment, the MFC 110 that is being tested may be connected to the MFV 100. During idle, flow of the fluid from the MFC 110 to the MFV 100 is shut off. When a verification run of the MFV 100 is initiated, the inlet valve 120 and the outlet valve 150 are opened, so that fluid flows from the MFC 110 to the MFV 100. The MFC 110 may be provided with a flow set point. During an initialization period, the fluid flow rate from the MFC 110 and the pressure of the fluid within the chamber 130 are allowed to reach a steady-state.

Once a steady-state is reached, the outlet valve 150 is closed, so that the pressure of the fluid begins to build up within the chamber 130. The controller 160 determines the rate of rise of the pressure (i.e. the rate of change or time derivative of the pressure) during a time period, by receiving pressure measurements from the pressure sensor 170 within the chamber 130, and temperature measurements from the temperature sensor 180.

For example, temperature and pressure measurements within the chamber 130 may be recorded at predetermined time intervals throughout the time period. In one exemplary embodiment, the predetermined time intervals may be about 0.00025 seconds each, and the time period may range from about 0.1 second to about 30 seconds. Of course, different time intervals and time periods may be used in other embodiments of the MFV 100. At the end of the time period, the outlet valve 150 is opened, to allow flow of the fluid out of the chamber 130 onto an exhaust (such as a vacuum pump, by way of example) or other type of output facility.

The rate of rise or time derivative of the fluid pressure (divided by the fluid temperature T), namely Δ(P/T)/Δt, may be calculated based on the measurements of temperature and pressure within the known volume V of the chamber 130. Based on the calculated rate of rise Δ(P/T)/Δt, the flow rate produced by the MFC 110 can then be determined and verified, so that the MFC 110 can be properly calibrated. The flow rate Q is calculated by the controller 160 using equation (1) above.

A typical mass flow verification may proceed as follows:
1. Open both the upstream valve 120 and the downstream valve 150;
2. Give a flow set point for the DUT;
3. Wait until the chamber pressure is at steady state;
4. Start to record the chamber gas pressure and the chamber gas temperature for flow calculation;
5. Shut the downstream valve 150 so that the chamber pressure rises;
6. Wait for a period for flow verification;
7. Open the downstream valve 150;
8. Calculate and report the verified flow based on Eq. (1).

By controlling the operation of the upstream valve 120 and the downstream valve 150, based on the outputs from the pressure sensor 170 and the temperature sensor 180, and using a measured rate of rise of pressure over time to calculate the flow rate of the fluid from the DUT 110 into the chamber 130 according to Eq. (1), the controller 160 verifies the measurement of flow rate performed by the DUT 110.

Figure 2:
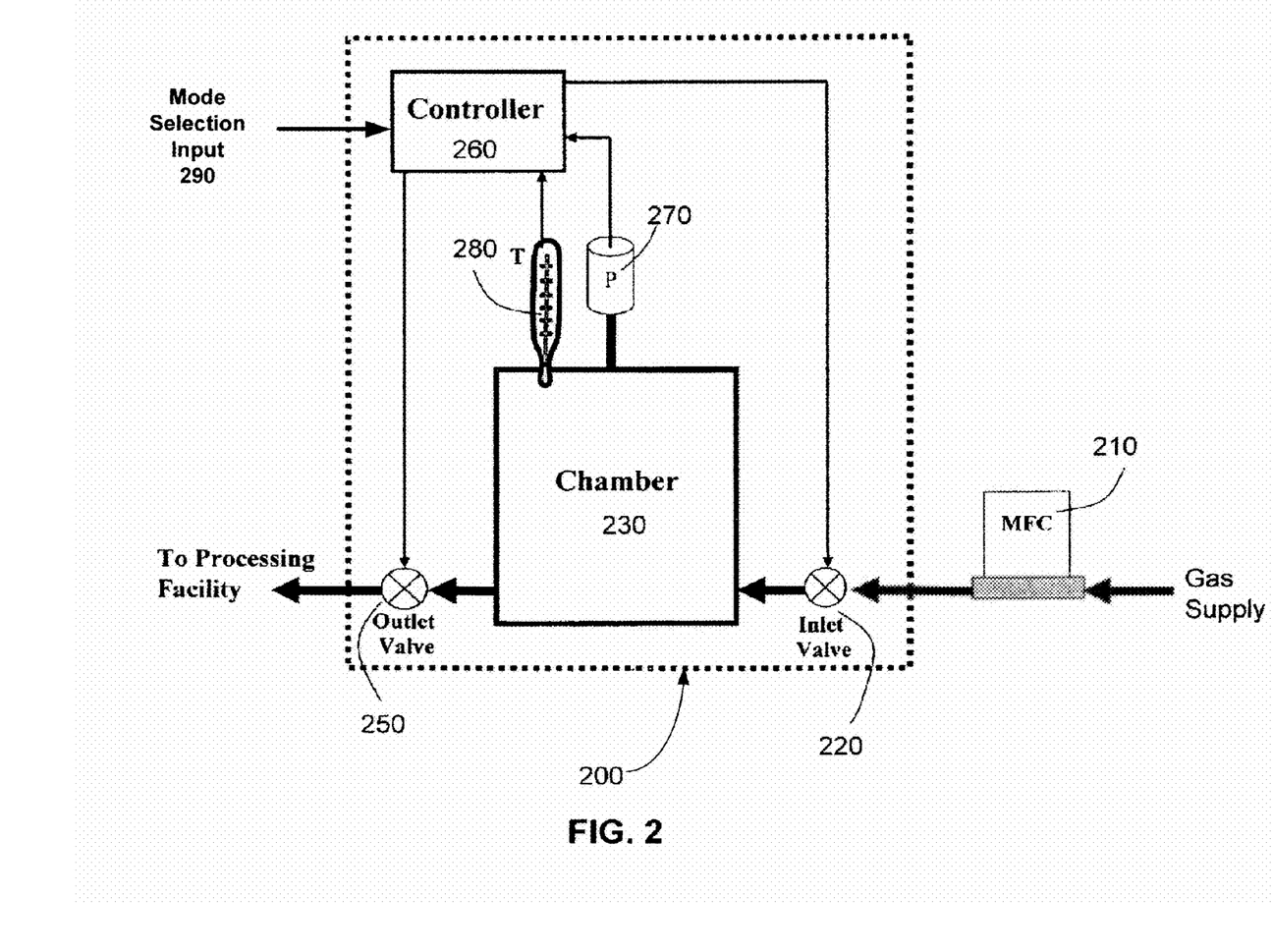
FIG. 2 schematically illustrates a mass flow delivery system.

FIG. 2 is a schematic illustration of an exemplary embodiment of a mass flow delivery system 200 in accordance with one embodiment of the present disclosure. The mass flow delivery system 200 includes a chamber 230, an inlet valve 220 that controls mass flow into the chamber 230, and a outlet valve 250 that controls mass flow out of the chamber 230. According to one exemplary embodiment of the present disclosure, the inlet valve 220 and the outlet valves 250 comprise on/off type valves, and at least the outlet valve 250 has a very fast response time, for example about 1 to 5 milliseconds.

The mass flow delivery system 200 also has a pressure transducer 270 for providing measurements of pressure within the chamber 230 and a temperature sensor 280 for providing measurements of temperature on or within the chamber 230. The pressure transducer 270 also has a very fast response time, for example about 1 to 20 milliseconds. According to one exemplary embodiment of the present disclosure, the temperature sensor 280 is in contact with, and provides measurements of the temperature of, a wall of the chamber 230.

Examples of a suitable pressure transducer 270 for use with the delivery system 200 are Baratron® brand pressure transducers available from the assignee of the present disclosure, MKS Instruments of Andover, Mass. (http://www.mksinst.com). Suitable valves 220, 250 are also available from the assignee.

The controller 260 is responsive to the user defined input 290 so that the mass flow delivery system is operable in one of two user selected modes. The controller 260 is programmed to control the opening and closing of the inlet valve 220 and the outlet valve 250, so as to deliver from the delivery chamber 230 into the output process facility a precise, known number of moles of gas.

In one embodiment, the delivery system 200 may be a pulsed delivery system configured to deliver the gas in a sequence of delivery pulses. In overview, the delivery system 200 delivers the gas in discrete pulses according to the following cycle:
1. Charge:
Open the inlet valve 220, allowing flow of the gas into the delivery chamber 230, and charge the chamber to a target pressure or a target amount of gas moles.
2. Wait for the pressure to be stabilized.
3. Deliver:

Open the outlet valve 250, which is connected to the process facility, measure the amount of gas delivered, and close the outlet valve 250 when the correct amount of gas has left the delivery chamber 230.

4. Proceed to the next cycle, in which steps 1, 2, and 3 above are repeated.

Figure 3:
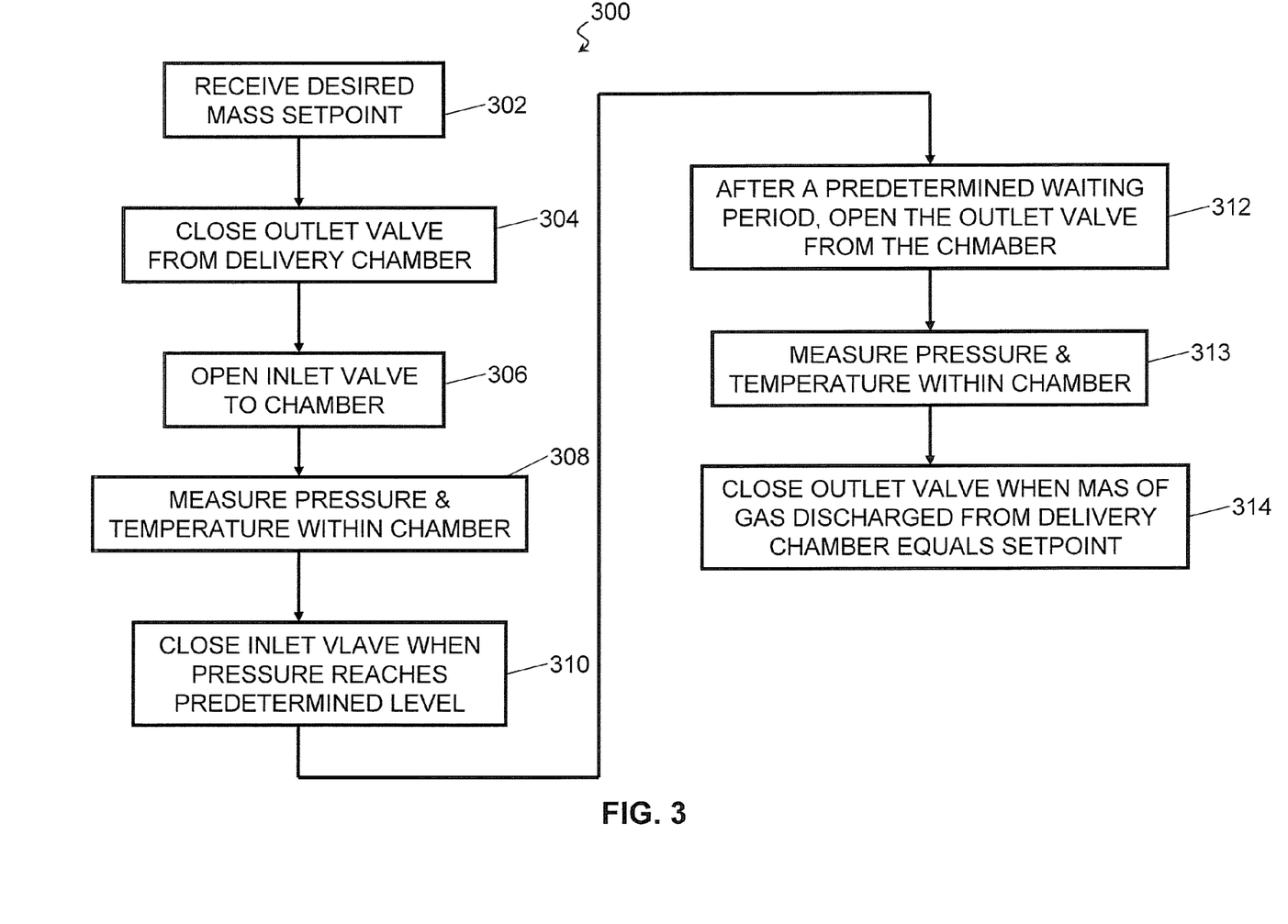
FIG. 3 is a flow chart illustrating an exemplary embodiment of a method of mass flow delivery.

FIG. 3 is a flow chart illustrating an exemplary embodiment of a method of mass flow delivery. According to one embodiment of the disclosure, the controller 260 of the mass flow delivery system 200 of FIG. 2 may be configured to carry out the method 300 of FIG. 3. Referring to FIGS. 2 and 3, the controller 260 is programmed to receive the desired mass flow delivery setpoint, for example through an input device, as shown at 302 of FIG. 3, close the outlet valve 250, as shown at 304 of FIG. 3, and open the inlet valve 220 to the chamber 230, as shown at 306 of FIG. 3.

The controller 260 is further programmed to receive measurement signals from the pressure transducer 270 and the temperature sensor 280, which measure the pressure and the temperature of the gas within the chamber 230 respectively, as shown at 308 of FIG. 3. The controller 260 is further programmed to close the inlet valve 220 when pressure within the chamber 230 reaches a predetermined level, as shown at 310 of FIG. 3. The predetermined level of pressure may be user defined, in which case it may be provided through the input device. Alternatively, it may be calculated by the controller 260 based on the desired mass flow delivery setpoint.

After a predetermined waiting period, during which the gas inside the chamber 230 can approach a state of equilibrium, the controller 260 opens the outlet valve 250, to discharge a mass of gas from the delivery chamber 230 to an output processing facility, as shown at 312 of FIG. 3. The predetermined waiting period may be user defined, in which case it may be provided through the input device. Alternatively, the predetermined waiting period may be determined by the controller 260 based on the equilibrium state of the gas inside the delivery chamber. The controller 260 is further programmed to receive measurement signals from the pressure transducer 270 and the temperature sensor 280 in order to monitor the amount of mass flow delivered to an output processing facility as shown at 313 of FIG. 3. The outlet valve 250 may then be closed, when the mass of gas discharged equals the user defined desired mass flow setpoint, as shown at 314 of FIG. 3. Typically, the outlet valve 250 may only be opened for only a very short period (e.g., 100 to 1000 milliseconds). The controller 260 may then indicates the mass of gas that has been discharged to the output device.

In one embodiment, the delivery system 200 may be a mole delivery device (MDD) configured to accurately measure and control the number of moles of gas (or other fluid) it delivers to an output processing facility, such as a semiconductor wafer processing chamber by way of example. In this embodiment, the controller 260 is configured to count the number of moles of gas that leaves the delivery chamber 230 while discharging to the processing facility.

The controller 260 of the gas delivery system 200 may implement model-based algorithms to measure and control the number of moles of gas that flows into the holding volume of the delivery chamber 230. The algorithms implemented by the controller 260 may allow the number of moles of gas that flows into and out of the chamber 230 to be counted. In the gas delivery system 200 above, therefore, the mole number of gas leaving the delivery chamber 230 will be known when the delivery chamber 230 discharges into the processing facility.

In one embodiment, the controller 260 may implement a model-based algorithm that causes the controller 260 to monitor the pressure measurements by the pressure sensor 270 and the temperature measurements by the temperature sensor 280, and to use the ideal gas law to derive the desired number of moles.

In this embodiment, the controller 260 opens the inlet valve 220 so as to introduce the gas into the delivery chamber 230. The gas is then charged to a target pressure. The controller 260 then measures the amount of the gas that goes into the holding volume of the delivery chamber 230, and closes the inlet valve 220 when a target number of moles are obtained in the holding volume. The number of gas moles charged into the delivery chamber 230 during this stage is given by:

$$\Delta n = \frac{V_c}{R} \Delta\left(\frac{P}{T}\right). \quad (2)$$

In Eq. (2) above, $\Delta n$ denotes the number of moles delivered into the delivery chamber 230, $V_c$ denotes the volume of the delivery chamber 230, R denotes the universal gas constant (having a value of 8.3144 Joules/mol/K), and $\Delta(P/T)$ is the change in gas pressure divided by gas temperature, from the beginning of the step 306 to the end of the step 310. Eq. (2) shows that, by monitoring the values of P and T, as measured by the pressure sensor 270 and the temperature sensor 280 at desired points in time, the number of moles being charged into the delivery chamber 230 during any given time period can be monitored.

After the target amount of gas moles is reached within the delivery chamber 230 during the charge stage, the controller 260 causes the system 200 to wait for a while for the pressure and the temperature of the gas to be stabilized. The system 200 then moves on to the delivery stage, during which the number of moles of the gas is precisely delivered to an output processing facility. The controller 260 opens the outlet valve 250, which leads to the output processing facility. The controller 260 measures the number of moles of the gas that leaves the delivery chamber 230 according to Eq.(2) using the measurement signals of the pressure transducer 270 and the temperature sensor 280. The controller 260 closes the outlet valve 250 when the correct desired number of moles of gas has left the delivery chamber 230 and delivered to the output processing facility.

Once an entire delivery cycle has been completed, the controller 260 causes the system 200 to return to the initial stage, and repeat the entire delivery cycle, for the next mass flow delivery setpoint. For each delivery cycle, the system 200 directly measures and precisely controls to deliver a specific number of moles of the gas into the output processing facility, using the technique described above.

Figure 4:
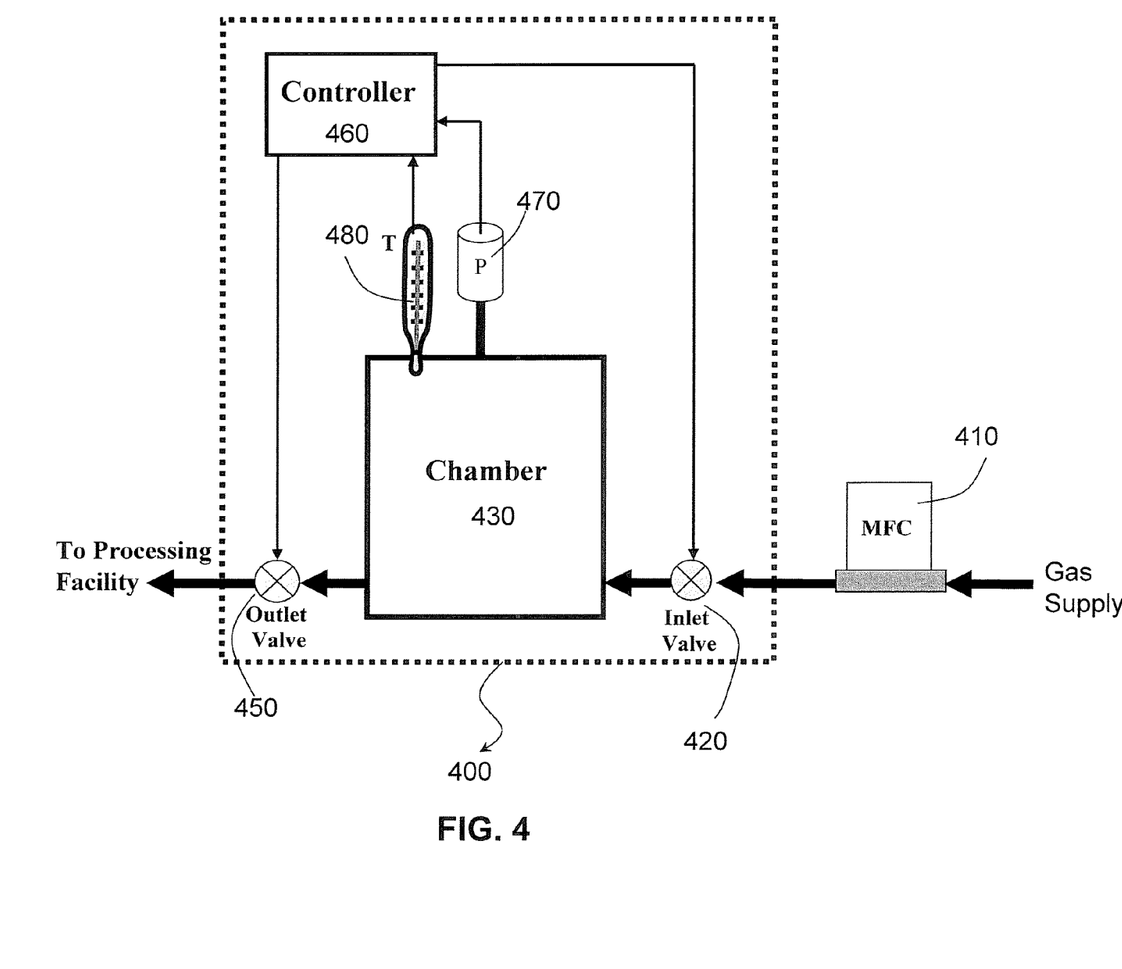
FIG. 4 is a schematic illustration of a dual-mode mass flow verification and mass flow delivery system, in accordance with one embodiment of the present disclosure.

FIG. 4 is a schematic illustration of a dual-mode mass flow verification and mole delivery system 400, in accordance with one embodiment of the present disclosure. The system 400 includes a chamber 430; an inlet valve 420 configured to control flow of a fluid into the chamber; and an outlet valve 450 configured to control flow of the fluid out of the chamber 430. The system 400 further includes a pressure sensor 470 configured to measure the pressure within the chamber 430. The system may further include a temperature sensor 480 configured to measure the temperature within the chamber 430.

The system 400 further includes a controller 460. The controller 460 is configured, when in a first mode, to control opening and closing of the inlet valve and the outlet valve so as to verify a measurement of the flow rate of the fluid by a device 410. In other words, when the controller 460 is in the first mode, the system 400 operates as a mass flow verifier for verifying the flow rate of the unit under test (UDT) 410. The device 410 is shown in FIG. 4 as an MFC. Other devices for which mass flow verification may be performed include, but are not limited to, an FRC. The controller 460 is further configured, when in a second mode, to control opening and closing of the inlet and outlet valves so as to deliver a desired amount of the fluid from the chamber 430 into an output processing facility, for example a semiconductor wafer processing chamber. In other words, when the controller 460 is in the second mode the system 400 operates as a mass flow delivery system.

The controller 460 may be responsive to input from a user, for selecting between the first mode and the second mode. The controller 460 may be configured to receive an input signal (for example, directly from a user, or indirectly from a computer system at the output processing facility) indicative of a selection between the first and second modes, and to operate at either the first mode or the and second mode, in response to the received input signal. The system 400 may include an input device (not shown) that transmits the input signal indicative of the selection between the first and second modes, and the controller 460 may be configured to receive the input signal through the input device.

The controller 460 may be configured, when in the first mode (i.e. in the mass flow verification mode), to implement the ROR technique for mass flow verification. In other words, the controller 460 may be configured to measure a rate of rise in the pressure of the fluid within the chamber during a time period after a closing of the outlet valve, and to calculate the flow rate of the fluid from the device using the measured rate of rise, as described in conjunction with FIG. 1 above.

The controller 460 may be configured, when in the second mode (i.e. the mass flow delivery mode), to measure a mass of the fluid that flows into the chamber 430 during a time period, and then to deliver a desired mass of the fluid into an output processing facility by controlling opening and closing of the inlet valve 420 and the outlet valve 450.

In one embodiment, the system may be configured to operate as a MDD (mole delivery device), when the controller 460 is in the second mode. In this embodiment, the desired mass of the fluid may be desired number of moles of the fluid. As explained earlier in conjunction with FIG. 2 and FIG. 3, the controller may be configured, when in the second mode, to measure a number of moles of the fluid that flows into the chamber during the charge stage and then to control a number of moles of the fluid that delivers into the output processing facility during the delivery stage by monitoring pressure measurements of the pressure transducer 470 and temperature measurements of the temperature sensor 480 and controlling opening and closing of the inlet valve 420 and the outlet valve 450. The number of moles of the gas that charges into the chamber and the number of moles of the gas that deliveres into the processing facility may be calculated using Eq. (2) above.

Figure 5:
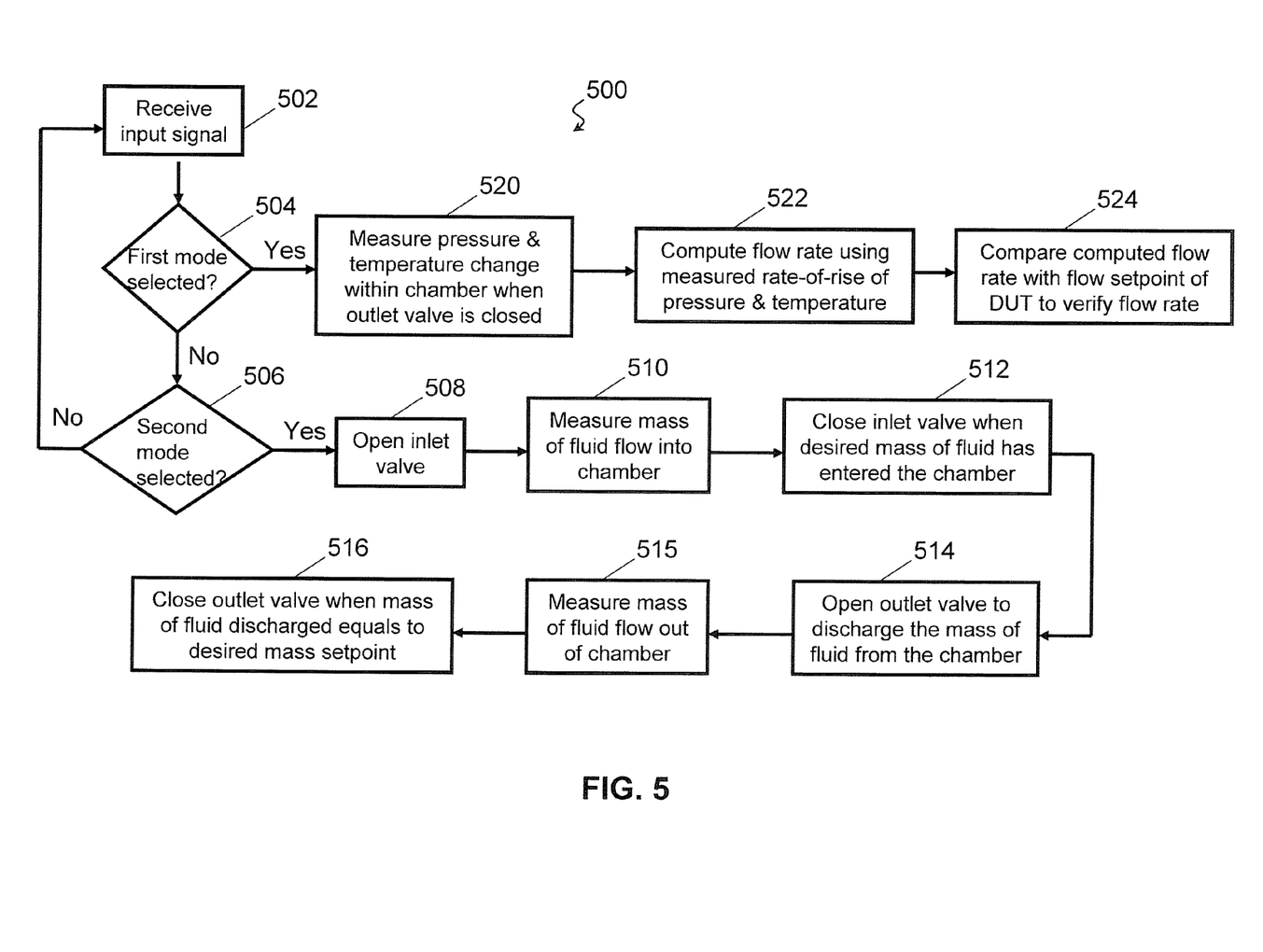
FIG. 5 is a flow chart illustrating an exemplary embodiment of a method of performing mass flow verification and mass flow delivery, in accordance with one embodiment of the present disclosure.

FIG. 5 is a flow chart illustrating an exemplary embodiment of a method 500 of performing mass flow verification and mass flow delivery, in accordance with one embodiment of the present disclosure. The method 500 may include receiving an input signal indicative of a selection between a first mode and a second mode of operation of a system, as shown at 502 of FIG. 5.

When the input signal indicates selection of the first mode, as shown at 504 of FIG. 5, the system 400 operates in a mass flow verification mode to verify a measurement of the flow rate of the fluid by a device. In this mode, the method 500 may include an act 520 of measuring a rate of rise in the pressure of the fluid within the vessel during a time period, and an act 522 of using the measure rate of rise of the pressure to calculate the flow rate of the fluid. The method 500 may further include an act 524 of comparing the computed flow rate with a flow set point of the DUT to verify the flow rate.

When the input signal indicates selection of the second mode, as shown at 506 of FIG. 5, the system 400 operates in a mass flow delivery mode, to deliver a desired amount of the fluid from a chamber 430 in the system 400 into an output processing facility, such as a processing chamber. In this mode, the method 500 may include an act 508 of opening the inlet valve 420 in the system 400 to allow the fluid to flow into the chamber 430, and an act 510 of measuring an amount of the fluid that flows into the chamber 430 through the inlet valve 420. The method 500 may further include the act 512 of closing the inlet valve 420 when a desired amount of the fluid has entered the chamber, the act 514 of opening the outlet valve 450 to discharge the mass of fluid from the chamber 430, and closing the outlet valve 450 when the mass of gas discharged equals the desired mass set point of the fluid.

The methods and systems described in the present disclosure are not described with reference to any particular programming language. It will be appreciated that a variety of programming languages may be used to implement the teachings of the present disclosure. The controller may consist of, or include, one or more processing systems. These processing systems may be selectively configured and/or activated by a computer program stored therein. Such a computer program may be stored in any computer readable storage medium, including but not limited to, any type of disk including floppy disks, optical disks, CD-ROMs, and magnetic-optical disks, read-only memories (ROMs), random access memories (RAMs), erasable programmable read-only memory (EPROMs), electrically erasable programmable read-only memory (EEPROMs), magnetic or optical cards, or any type of media suitable for storing electronic instructions.

The methods and systems presented herein are not inherently related to any particular computer, processor or other apparatus. Various general purpose systems may be used with different computer programs in accordance with the teachings herein. Any of the methods and systems described in the present disclosure may be implemented in hard-wired circuitry, by programming a general purpose processor, a graphics processor, or by any combination of hardware and software.

In sum, methods and systems have been described that allow both mass flow verification and mass flow delivery to be implemented by a single dual-mode device. A cost effective solution is thereby provided to customers for both mass flow verification and mass flow delivery requirements, in a compact design.

While the specification describes particular embodiments of the present invention, those of ordinary skill can devise variations of the present invention without departing from the inventive concept. The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A system for mass flow delivery of a fluid and for mass flow verification of the fluid, the system comprising:
   a chamber;
   an inlet valve configured to control flow of the fluid into the chamber;
   an outlet valve configured to control flow of the fluid out of the chamber;
   a pressure sensor configured to measure pressure within the chamber; and
   a controller;
   wherein the controller is configured, when in a first mode, to control opening and closing of the inlet valve and the outlet valve so as to verify a measurement of the flow rate of the fluid by a device; and wherein the controller is further configured, when in a second mode, to control opening and closing of the inlet and outlet valves so as to deliver a desired amount of the fluid from the chamber into an output processing facility, and
   wherein the controller is responsive to an input for selecting between the first mode and the second mode.

2. The system of claim 1, further comprising an input device for transmitting the input signal indicative of the selection between the first and second modes, and wherein the controller is configured to receive the input signal through the input device.

3. The system of claim 1, further comprising a temperature sensor configured to measure temperature of the fluid within the chamber.

4. The system of claim 1, wherein the controller is configured, when in the first mode, to measure a rate of rise in the pressure of the fluid within the chamber during a time period after a closing of the outlet valve, and to calculate the flow rate of the fluid from the device using the measured rate of rise.

5. The system of claim 4, wherein the controller is further configured, when in the first mode, to calculate a flow rate Q of the fluid from the device using a formula given by:

$$Q_{in} = \frac{k_0 \cdot T_{stp} \cdot V_c}{P_{stp}} \frac{d}{dt}\left(\frac{P}{T}\right)$$

where P is the gas pressure within the chamber;
T is the gas temperature;
$V_c$ is the volume of the chamber vessel;
$k_0$ is a conversion constant, $6 \times 10^7$ in sccm (standard cubic centimeters per minute) units and $6 \times 10^4$ in slm (standard liters per minute) units;
$P_{stp}$ is the standard pressure (=1.01325e5 Pa); and
Tstp is the standard temperature (=273.15 K).

6. The system of claim 1, wherein the device comprises at least one of:
   a mass flow controller and a flow ratio controller.

7. The system of claim 1, wherein the controller is configured, when in the second mode, to measure a mass of the fluid that flows into the chamber during a time period, and then to deliver a desired mass of the fluid into an output processing facility by controlling opening and closing of the inlet valve and the outlet valve.

8. The system of claim 7, wherein the desired mass of the fluid comprises a desired number of moles of the fluid, and wherein the controller is configured, when in the second mode, to measure a number of moles of the fluid that flows into the chamber during the time period by monitoring pressure measurements of the pressure transducer and temperature measurements of the temperature sensor.

9. The system of claim 8, wherein the number of moles of a precursor gas delivered into the chamber during the time period and occupying a volume $V_c$ of the chamber is given by:

$$\Delta n = \frac{V_c}{R} \Delta\left(\frac{P}{T}\right),$$

where $\Delta n$ denotes the number of moles of the gas delivered into the chamber during the time period,
R denotes a universal gas constant that has a value of 8.3144 (Joules)(mol$^{-1}$)(K$^{-1}$),
P denotes pressure of the gas occupying the chamber volume,
T denotes temperature of the gas occupying the chamber volume, and
$\Delta(P/T)$ denotes a change in a ratio between P and T between beginning and end of the time period.

10. The system of claim 9, wherein the controller is further configured, when in the second mode, to:
   open the inlet valve to allow the gas to flow into the chamber;
   measure a number of moles of the gas that flows into the chamber through the inlet valve by monitoring pressure measurements of the pressure transducer and temperature measurements of the temperature sensor; and
   close the inlet valve when a desired number of moles of the gas have entered the delivery chamber.

11. The system of claim 10, wherein the controller is further configured, when in the second mode, to:
   open the outlet valve to discharge the mass of fluid from the chamber to the output processing facility;
   measure a number of moles of the gas that discharges into the output processing facility through the outlet valve by monitoring pressure measurements of the pressure transducer and temperature measurements of the temperature sensor; and
   close the outlet valve when the mass of gas discharged equals the desired mass flow setpoint.

12. The system of claim 10, wherein the desired number of moles of the gas is user-specified 13. The system of claim 10,
   wherein the controller is further configured to repeat, during each of a plurality of delivery cycles, the acts of controlling the opening and closing of the inlet valve and the outlet valve so as to introduce a desired number of moles of the gas into the chamber, and then to deliver a desired number of moles of the gas from the chamber into an output processing facility.

14. The system of claim 10, wherein the desired number of moles of the gas is calculated by the controller based on the desired mass flow setpoint.

* * * * *